(12) United States Patent
Mann

(10) Patent No.: US 10,955,078 B2
(45) Date of Patent: Mar. 23, 2021

(54) ATTENUATOR

(71) Applicant: Grace Precision Products, LLC, Webb City, MO (US)

(72) Inventor: Michael David Mann, Joplin, MO (US)

(73) Assignee: Grace Precision Products, LLC, Webb City, MO (US)

( * ) Notice: Subject to any disclaimer, the term of this patent is extended or adjusted under 35 U.S.C. 154(b) by 96 days.

(21) Appl. No.: 16/155,402

(22) Filed: Oct. 9, 2018

(65) Prior Publication Data

US 2020/0109808 A1 Apr. 9, 2020

(51) Int. Cl.
| | | |
|---|---|---|
| *F16L 55/04* | (2006.01) | |
| *F16L 55/027* | (2006.01) | |
| *F15D 1/02* | (2006.01) | |
| *F04C 15/00* | (2006.01) | |
| *F16L 55/053* | (2006.01) | |

(52) U.S. Cl.
CPC ........ *F16L 55/043* (2013.01); *F04C 15/0049* (2013.01); *F15D 1/025* (2013.01); *F16L 55/027* (2013.01); *F16L 55/053* (2013.01)

(58) Field of Classification Search
CPC .......... F15B 21/008; F15D 1/025; F16D 2014/0215; F17D 1/20; F16L 55/02; F16L 55/027; F16L 55/033; F16L 55/0331; F16L 55/04; F16L 55/041; F16L 55/043; F16L 55/045; F16L 55/05; F16L 55/1657
USPC .......................................... 91/171.1; 181/233
See application file for complete search history.

(56) References Cited

U.S. PATENT DOCUMENTS

| | | | | |
|---|---|---|---|---|
| 1,512,570 A | * | 10/1924 | Andrews .................. | F16J 10/04 92/171.1 |
| 1,971,159 A | * | 8/1934 | Laurent .................. | F16L 55/027 138/44 |
| 3,232,638 A | * | 2/1966 | Hollander ............... | E21B 17/16 285/55 |
| 4,423,778 A | * | 1/1984 | Goldsmith .............. | E21B 17/00 166/134 |
| 5,288,113 A | * | 2/1994 | Silvis ................. | G01N 30/6026 285/334.4 |
| 5,609,477 A | | 3/1997 | Saurwein | |
| 6,085,796 A | * | 7/2000 | Riga ........................ | F16L 9/18 138/109 |

(Continued)

FOREIGN PATENT DOCUMENTS

DE     102011014938 A1     10/2011

OTHER PUBLICATIONS

Extended European search report (EESR); dated Mar. 12, 2020.

*Primary Examiner* — Robert K Arundale
*Assistant Examiner* — Richard K. Durden
(74) *Attorney, Agent, or Firm* — Erickson Kernell IP, LLC; William Kircher

(57) ABSTRACT

An attenuator for high pressure fluid systems includes a shielding stud including first and second ends and a cylindrical space extending therebetween. The attenuator comprises a cylindrical, attenuator body disposed within the cylindrical space and defining a pressure chamber therein. First and second seal heads are positioned within first and second ends of said shielding stud and coupled to the attenuator body using a tensioner assembly and a plug threadingly coupled to first and second inner threaded surfaces of the shielding stud in first and second ends thereof.

4 Claims, 8 Drawing Sheets

(56) References Cited

U.S. PATENT DOCUMENTS

| | | |
|---|---|---|
| 6,712,096 B1 | 3/2004 | Tischler |
| 9,163,617 B2 | 10/2015 | Mann |
| 10,627,020 B2 * | 4/2020 | Goodwin ................ B23P 15/00 |
| 2006/0123616 A1 * | 6/2006 | Aday ...................... F04B 15/02 |
| | | 29/446 |
| 2014/0224366 A1 * | 8/2014 | Johnston ................ B26F 3/004 |
| | | 138/26 |
| 2016/0186745 A1 * | 6/2016 | Roll ........................ F04B 37/12 |
| | | 92/169.1 |
| 2016/0298614 A1 * | 10/2016 | Gaillard .................. F04B 9/113 |
| 2017/0356585 A1 * | 12/2017 | Baltes ................... F16L 55/045 |

\* cited by examiner

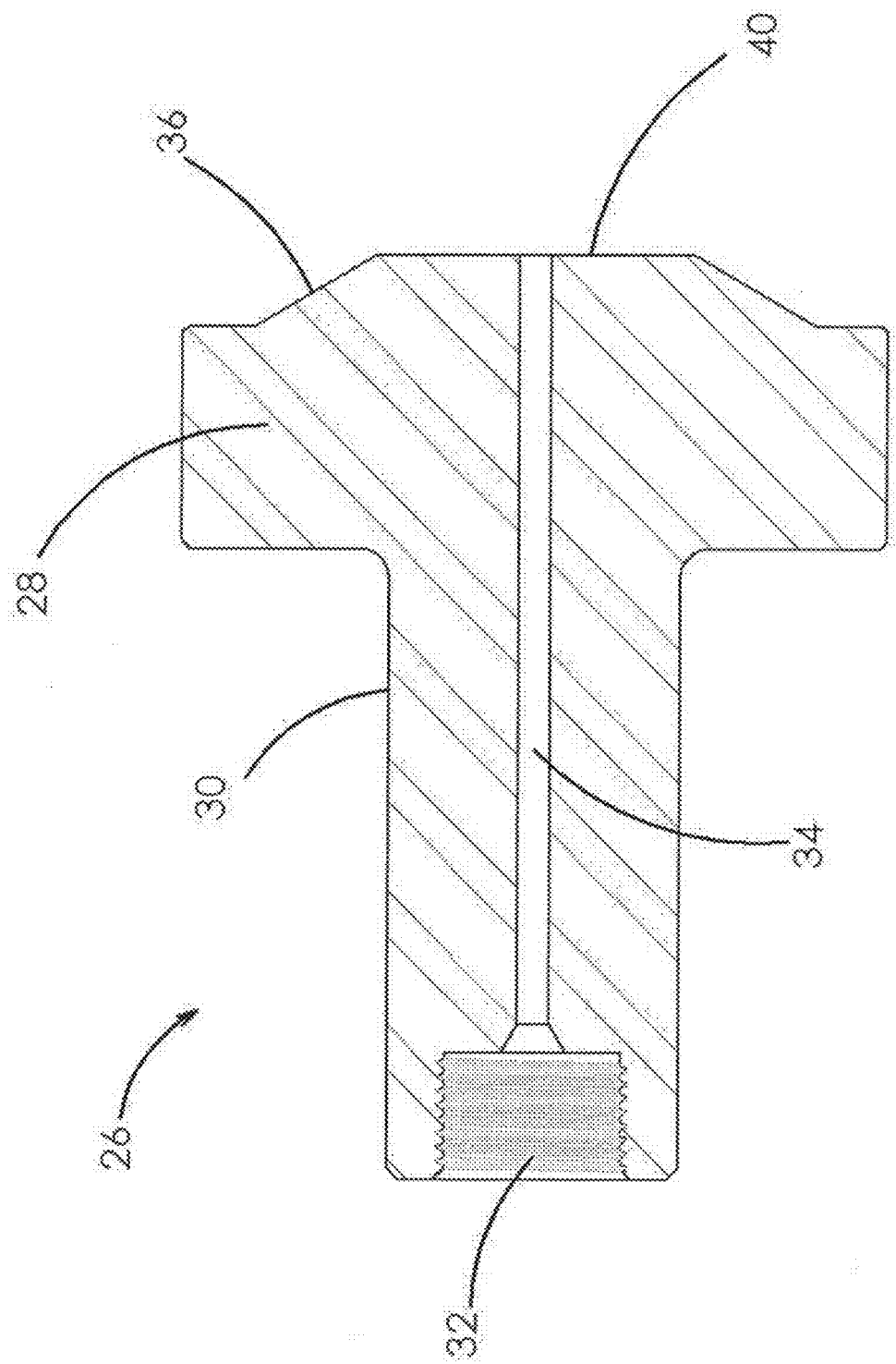

ATTENUATOR

CROSS-REFERENCE TO RELATED APPLICATIONS

None.

BACKGROUND OF THE INVENTION

The present invention relates to high-pressure fluid systems and particularly to attenuators for absorbing pressure spikes in high-pressure fluid systems.

Conventional high-pressure fluid systems utilize attenuators that absorb pressure spikes created in the system when a piston, which creates the pressure in the system, is driven back and forth. A typical attenuator provides within the system a volume of fluid large enough to dampen pressure fluctuations present in fluid entering one end of the attenuator. The attenuator then delivers fluid from its opposite end at a more constant pressure.

The walls of high-pressure attenuators must withstand great stresses due to internal pressure. One common type of attenuator known in the prior art is shown in FIG. 1. As shown, it includes a body having a pressure chamber that is sealed off with seal heads coupled to the ends of the attenuator body by fasteners that are anchored in the wall of the pressure chamber and protrude beyond the end of the pressure chamber far enough for the seal head to be threadedly fastened to the pressure chamber.

The high pressures, under which attenuators operate, coupled with the presence of fasteners that extend into the wall of the attenuator body beyond the end of the pressure chamber, can create stress raisers within the attenuator walls causing cracks and fatigue problems. In addition, the assembly process to properly secure the seal-head to the pressure chamber is complex because of the strict requirement to get proper tension on the studs and because the process is very time consuming.

Alternatively, an attenuator for high-pressure system can comprise a body defining a pressure chamber therein. One such design as known in the prior art is shown in FIG. 2. At least one end of the body includes an opening to the pressure chamber. The body also includes an engaging wall extending beyond the opening to the pressure chamber. The engaging wall defines a sealing chamber therein. A seal head is positioned within the sealing chamber and seals the opening to the pressure chamber. The seal head includes a passageway therethrough for the passage of fluid from the pressure chamber. A tensioner is threadedly coupled to the engaging wall and positioned around the passageway within the sealing chamber. A plurality of jackbolts is threaded through the tensioner and includes ends contacting the seal head to bias the seal head against the opening to the pressure chamber.

In certain configurations of the design shown in FIG. 2, the tensioner includes threads on an outer threaded surface of the tensioner which engage mating threads on an inner threaded surface of the engaging wall. The jackbolts, threaded through the tensioner, push against a lateral face of the seal head forcing an engaging face of the seal head into engagement with a wedge surface surrounding the opening to the pressure chamber, thereby sealing the opening to the pressure chamber.

While the attenuator design shown in FIG. 2 overcomes the stress raisers in the pressure chamber wall and the assembly difficulties of the attenuator design shown in FIG. 1, neither design provides a sufficiently safe design that can prevent leaks through cracks in the pressure chamber from exhausting into the space around the attenuator. The space around the attenuator when it is in service can be near where people move about. Leakage from a crack in the pressure chamber wall can exhaust with very high energy and are potentially dangerous should a person be nearby.

In attempt to solve these problems, current designs commonly used in the industry use a non-loaded, bulky, secondary containment shell to protect nearby people or adjacent equipment should a rupture occur. Other attempts to solve these and similar problems are also provided in U.S. Pat. No. 6,712,096 entitled "High Pressure Attenuator," and U.S. Pat. No. 9,163,617 entitled "High Pressure Pump Including Hollow Stud," each of which are incorporated herein by reference.

Accordingly, a need exists for an improved attenuator design that is efficient, economical and safe and that can overcome the aforementioned problems.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views:

FIG. 8 is a schematic section view of a seal head portion of the attenuator of FIG. 5 in accordance with one embodiment of the present invention.

DETAILED DESCRIPTION OF THE INVENTION

Figure 1:
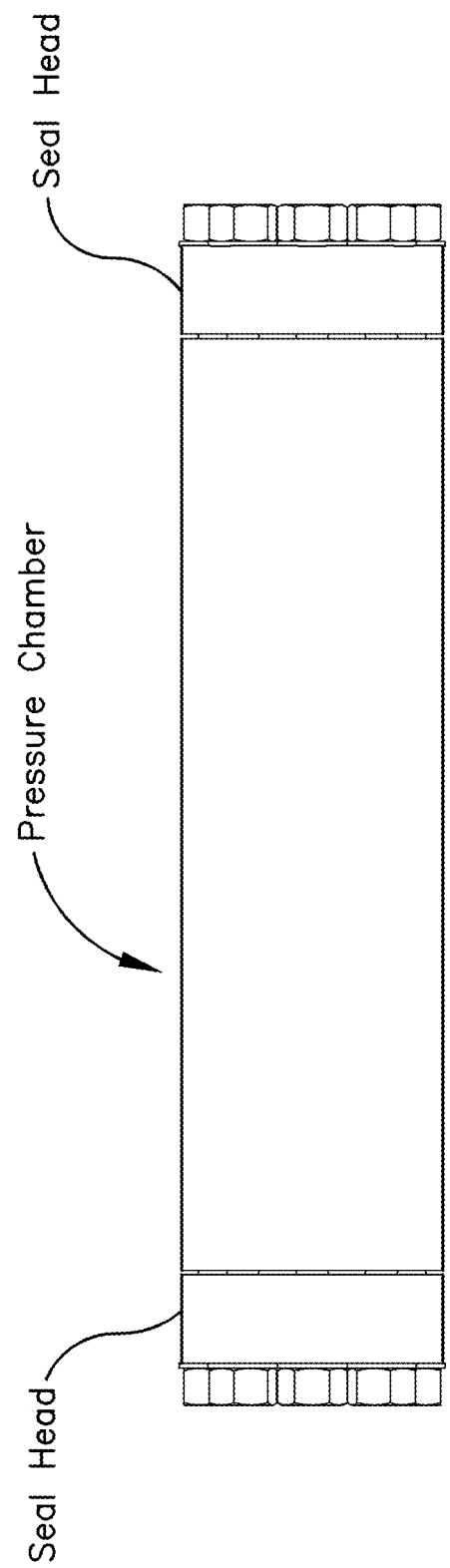
FIG. 1 is a perspective view of a first prior art design of an attenuator as known in the prior art.
Figure 2:
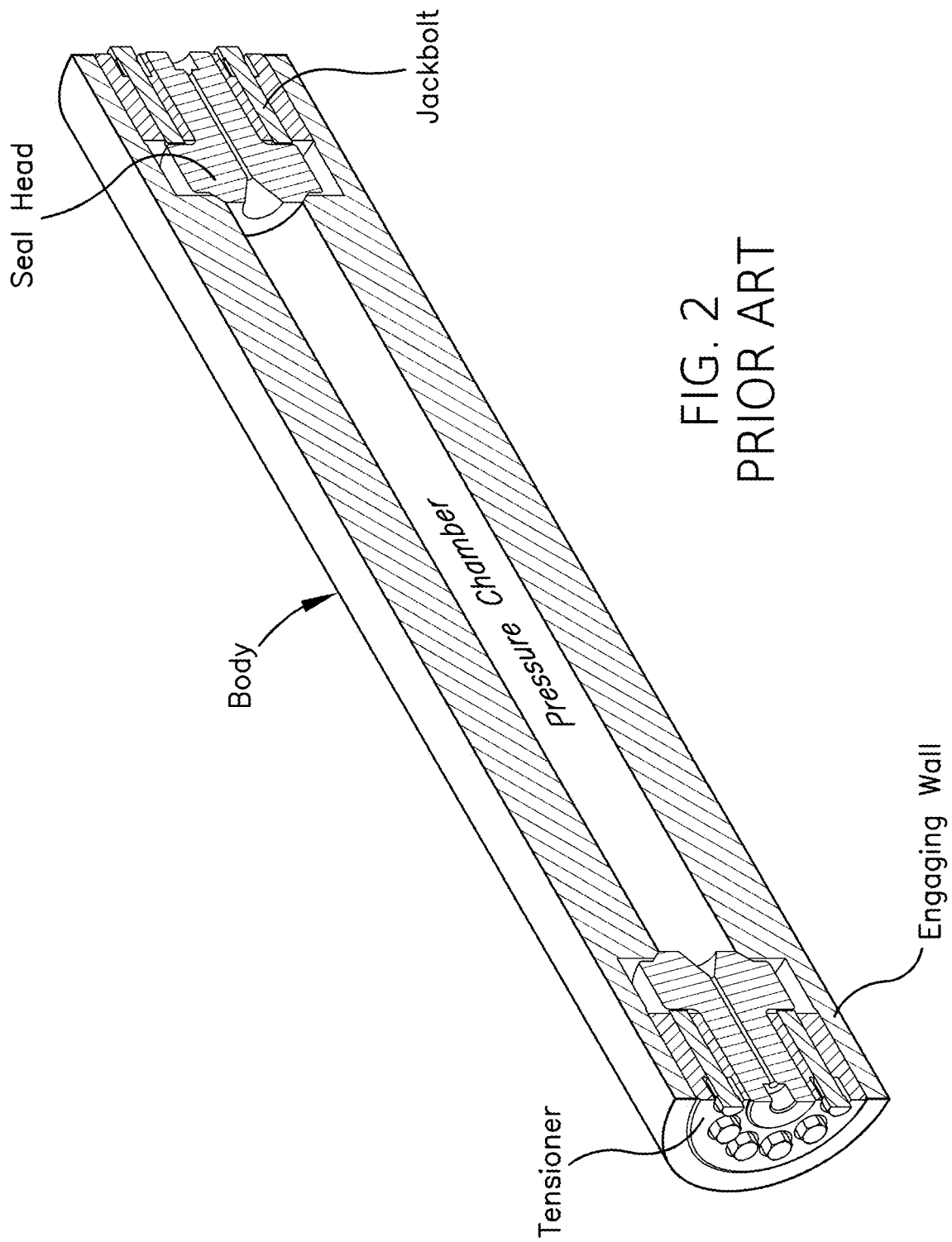
FIG. 2 is a schematic perspective view of a second prior art design of an attenuator as known in the prior art.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Before any embodiments of the present invention are described and explained in detail, it is to be understood that the invention is not limited in its application to the details of construction and the arrangement of components set forth in the following description or illustrated in the drawing figures. It is recognized that the invention is capable of other embodiments and of being practices or of being carried out in various ways.

In reference to the following description, the term "high pressure" as used herein refers to pressure in excess of 30,000 psi (2,069 bar). As is understood in the art, unique problems occur at these high pressures, and thus, solutions common to lower pressure pumps are not necessarily applicable in systems operating at pressures in excess of 30,000 psi or "high pressures."

Figure 3:
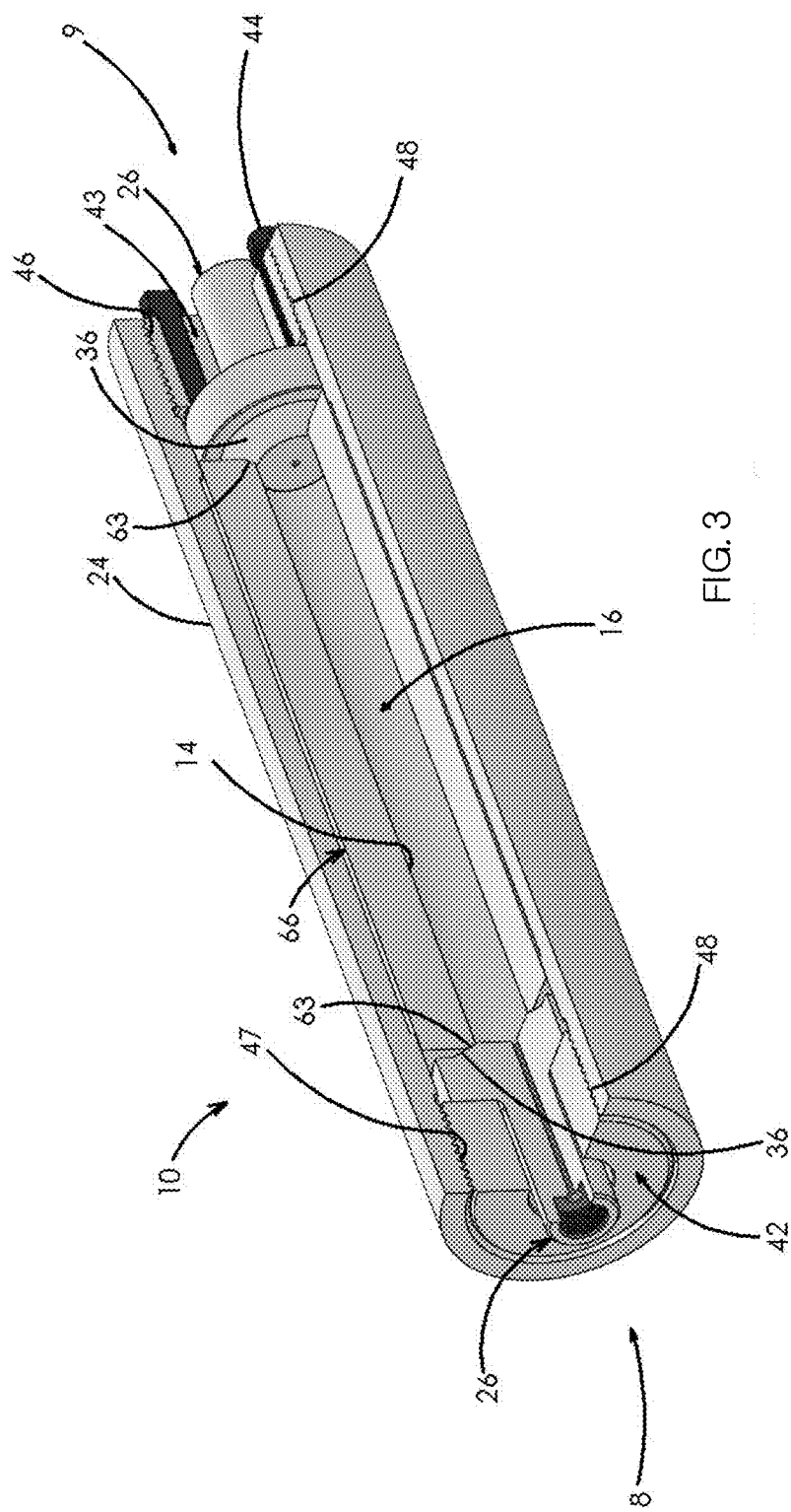
FIG. 3 is a schematic partial cut-away perspective view of an attenuator in accordance with one embodiment of the present invention.
Figure 4:
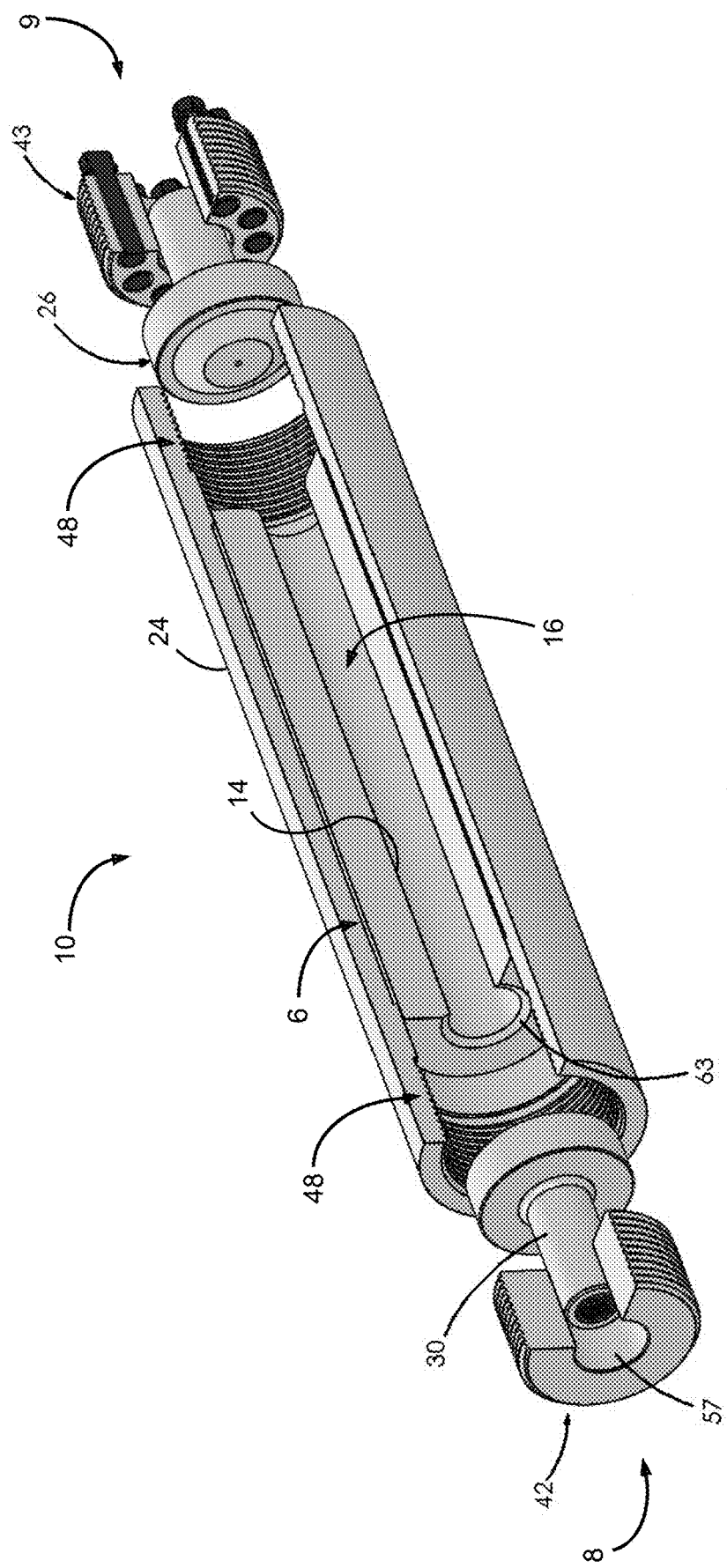
FIG. 4 is an exploded schematic partial cut-away perspective view of the attenuator of FIG. 3 illustrating the components of the attenuator in accordance with one embodiment of the present invention.

Referring to FIGS. 3 and 4, a shielding-stud attenuator 10 according to one embodiment of the present invention is schematically shown. As shown, attenuator 10 can include a shielding stud 24 containing an attenuator body 66 (as also shown schematically in FIG. 7) with seal heads 26 on each end. As shown in FIGS. 3 and 4, shielding stud 24 can have an elongated cylindrical shape defining the exterior of attenuator 10; however, it is recognized that shielding stud 24 and attenuator 10 can have any desired and suitable shape in alternative embodiments of the present invention. Attenuator body 66 can include an interior body surface 14 and can be located in a substantially centered axial position between the ends of shielding stud 24. As shown in FIGS. 3 and 4, attenuator body 66 can have a central axis about which the attenuator body 66 is generally cylindrical according to one embodiment of the present invention (however, as described above, alternative shapes and configurations are considered within the scope of the present invention).

Figure 7:
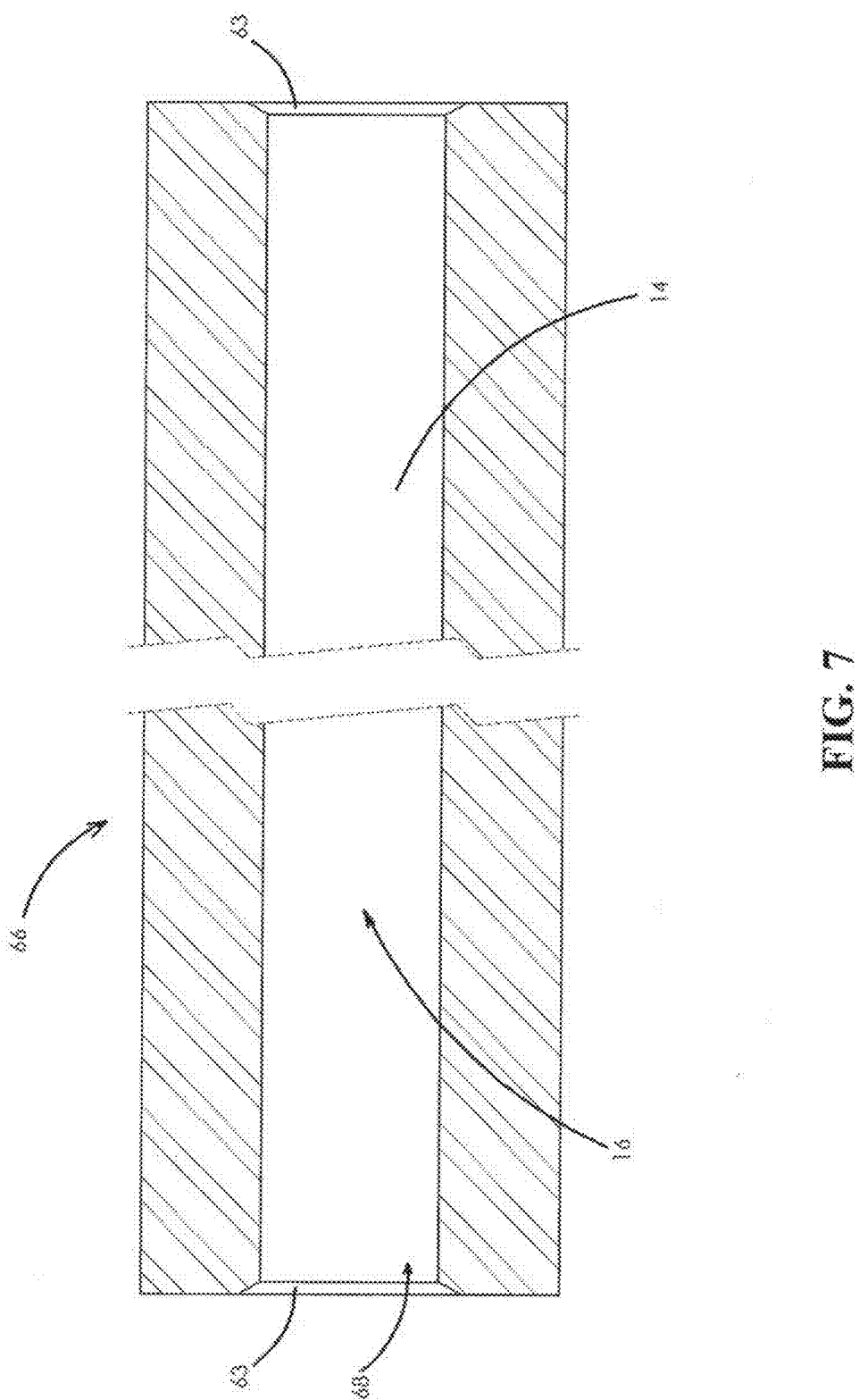
FIG. 7 is a schematic section view of an attenuator body portion of the attenuator of FIG. 5 in accordance with one embodiment of the present invention.

As shown in FIGS. 3 and 4, attenuator body 66 can include a wedge surface 63 at each end and an opening 68 (see also FIG. 7). Wedge surface 63 can be configured as an angled, tapered and/or beveled edge. As further shown in FIGS. 3 and 4, each of the two seal heads 26 can include a tapered engaging surface 36 configured to mate in sealing engagement with wedge surface 63 in attenuator body 66 thus defining a pressure chamber 16. The tapered engaging surface 36 can be configured to generally conform to the shape and angle of wedge surface 63 in order to create a conforming fit between seal heads 26 and attenuator body 66.

In operation, the pressure chamber 16 can be used to hold a volume of fluid that attenuates pressure fluctuations in the flow of fluid through a high-pressure system that can include the shielding-stud attenuator 10 of the present invention.

Figure 5:
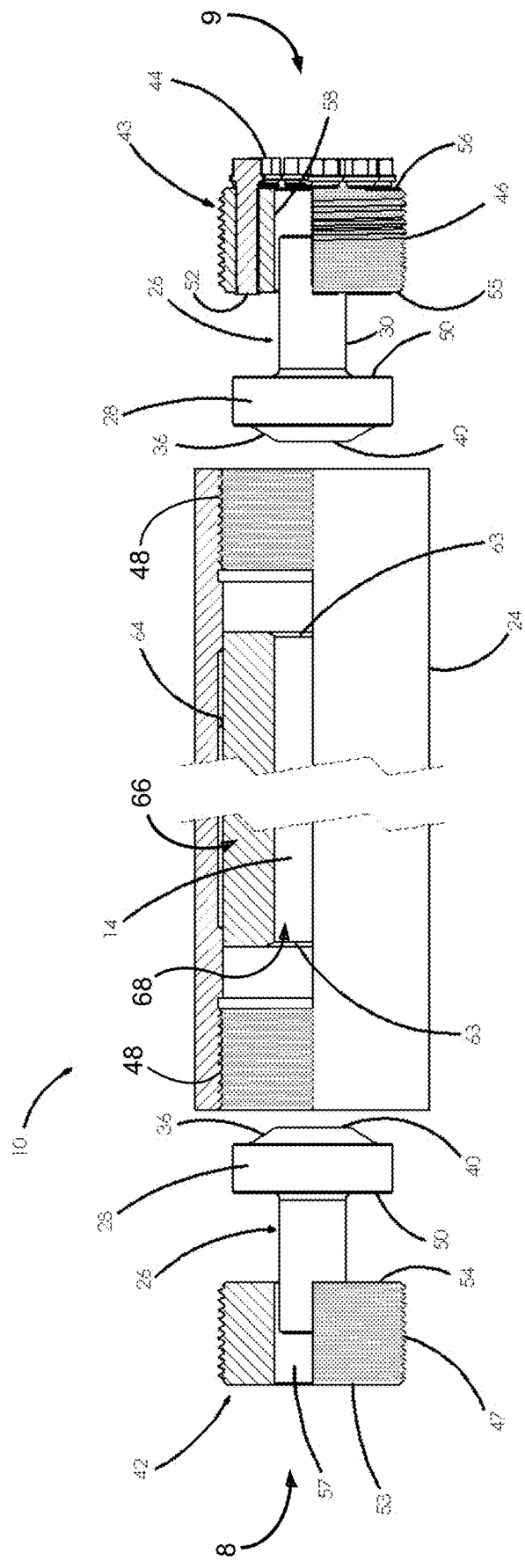
FIG. 5 is a schematic section view of an attenuator of in accordance with one embodiment of the present invention.

As illustrated in FIGS. 3-5, attenuator 10 can include a tension ring 43 at a distal end 9 of attenuator 10, and a threaded plug 42 at a proximal end 8 of attenuator 10. As best shown in FIG. 4, both tension ring 43 and threaded plug 42 can be threadably engaged in threaded openings 48 in shielding stud 24 (when assembled) to provide the counter-force required to maintain sealing forces required to maintain pressure during operation in pressure chamber 16.

Figure 6:
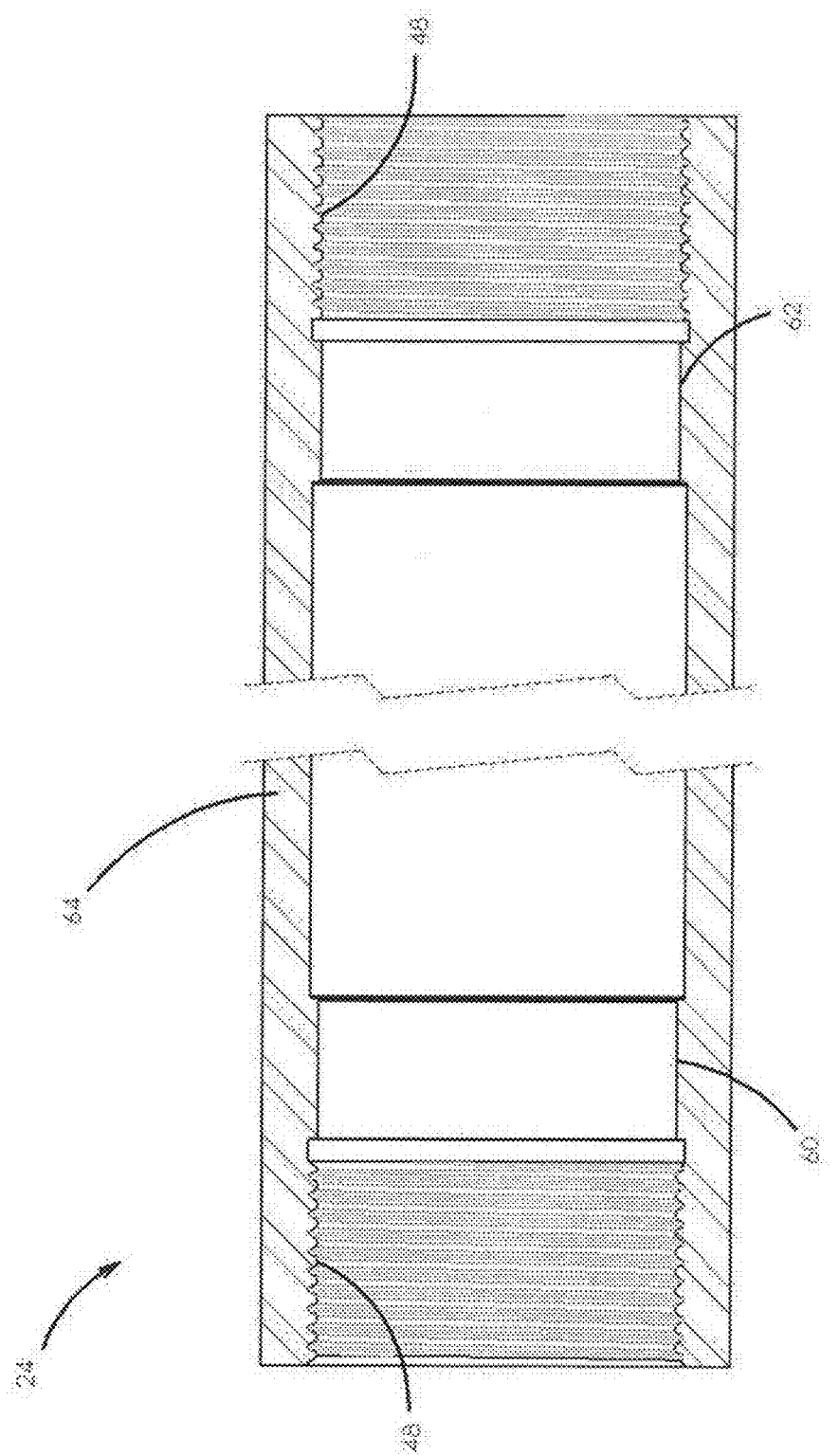
FIG. 6 is a schematic section view of a shielding stud portion of the attenuator of FIG. 5 in accordance with one embodiment of the present invention.

With reference to FIGS. 5 and 6, the shielding stud 24 can have a central axis about which the shielding stud 24 can be generally cylindrical according to one embodiment of the present invention. Shielding stud 24 (also shown in FIG. 7) can be formed to extend axially beyond each end of cylindrical opening 68 in the attenuator body 66. According to one embodiment, shielding stud 24 can extend beyond opening 68 with sufficient length to enclose each of threaded plug 42, tensioner nut 43 and approximately twice the axial length between tapered sealing surface 36 and back face 50 of each of the seal heads 26. Each end of shielding stud 24 can include internal threads 48 sized to receive an external thread 47 on threaded plug 42 or an external thread 46 on tensioner ring 43. According to the embodiment illustrated in FIGS. 5-8, the first end 60 of the shielding stud 24 (each shown in FIG. 6) and the second end 62 of the shielding stud 24 (also shown in FIG. 6) have a smaller interior diameter than a middle portion 64 of the shielding stud 24 such that a gap is formed between an inner surface of the middle portion 64 of the shielding stud 24 and an exterior surface of the attenuator body 66. An interior diameter of the inner surface of the middle portion 64 of the shielding stud 24 surrounding the attenuator body 66 is greater than an outer diameter of the attenuator body surrounded by the middle portion 64. In alternative embodiments, shielding stud 24 can have a uniform bore where the interior diameter of first and second ends 60 and 62 are approximately equal to the interior diameter of middle portion 64. According to certain embodiments, a close fit is provided between the outer surface of the attenuator body 66 and the surfaces 60 and 62 of the shielding stud 24 to allow ease of assembly and minimal lateral movement of the attenuator body.

As best shown in FIGS. 4 and 5, threaded plug 42 can have a central axis about which the threaded plug can be generally cylindrical according to one embodiment. As shown, threaded plug 42 can include a through-hole 57 that can be sized with sufficient clearance to allow a shaft portion 30 of seal head 26 to freely pass therethrough. As further shown in FIGS. 4 and 5, threaded plug 42 can include an outer thread 47 along the outside of the plug 42 with an outward facing surface 53 at the outer end of the plug 42 and a contact surface 54 at the opposite, inner end of the plug 42.

In the fully assembled shielding stud attenuator 10, OD thread 47 on threaded plug 42 (see FIG. 5) can fully threadedly engage ID thread 48 in proximal end 8 of shielding stud 24 and outward facing surface 53 on threaded plug 42 can be positioned substantially flush with the corresponding end of shielding stud 24. Contact surface 54 on threaded plug 42 can abut a contact surface 50 on proximally located seal head 26, thereby anchoring seal head 26 so tapered engaging surface 36 can be held in sealing engagement with opening 63 in proximal end 8 of attenuator body 66.

Similarly, the distally located seal head 26 can be positioned so tapered sealing surface 36 can be sealingly engaged with tapered opening 63 in attenuator body 66 at distal end 9.

As shown in FIGS. 3 and 4, tensioner ring 43 can include an outer thread 46 along the outside of ring 43 with an outward facing surface 56 at the outer end of ring 43 and a contact surface (or end face) 55 at the opposite, inner end of ring 43. At distal end 9 of the assembled shielding-stud attenuator 10, OD thread 46 on tensioner ring 43 can fully threadedly engage ID thread 48 in the end of shielding stud 24 and outward facing surface 56 on tensioner ring 43 can be positioned substantially flush with the distal end 9 of shielding stud 24. End face 55 on tensioner ring 43 may be in contact with surface 50 on seal head 26 or in close proximity to it. According to one specific embodiment of the present invention, this axial distance can be approximately 0.05-0.15 inches; however, the axial distance can be greater or smaller in various other alternative embodiments of the present invention.

FIG. 8 shows a schematic representation of seal head 26 according to one embodiment of the present invention. As shown, seal head 26 can include a tapered body portion 28 and a shaft portion 30 extending therefrom. The shaft portion 30 can include a connector 32 at one end, which can provide a high pressure connection point for a tube (not shown) carrying a fluid to the shielding-stud attenuator 10. The connector 32 can provide an inlet to a passageway 34 through the seal head 26 and to the pressure chamber 16. The tapered body portion 28 of the seal head 26 can include a tapered engaging face 36 that can mate with a wedge surface 63 extending from the opening 68 (as described above) and angling toward the engaging wall or inner surface 14 of attenuator body 66 (see FIG. 7). With the tapered engaging face 36 mating with the wedge surface 63, a plug end 40 of the seal head 26 can be firmly positioned in the pressure chamber 16, thereby sealing the opening 68.

As shown in FIG. 5, the distal seal head 26 can be held in sealing engagement with a tensioner ring 43 and a plurality of jackbolts 44. As described above, the tensioner ring 43 can include an outer threaded surface 46 that can threadedly engage an inner threaded surface 48 of shielding stud 24 (best seen in FIG. 4). According to such an embodiment, the tensioner ring 43 can be screwed into shielding stud 24 and end face 54 of tensioner ring 43 can abut a lateral face 50 of the seal head 26. Next, by screwing a plurality of jackbolts 44 through the tensioner ring 43, the seal head 26 can be forced proximally and held in engagement with the opening 68 through attenuator body 66 to create a high-pressure closure at the end of the pressure chamber 16. The jackbolts 44 can be threaded through the tensioner ring 43 proximally and include contacting ends 52 that can engage the lateral face 50 of the distal seal head 26. Tightening the jackbolts 44 can drive the distal seal head 26 proximally into engagement with the opening 68 against the counter force created by the tensioner ring 43 and its threaded engagement with thread 48 in shielding stud 24. In addition, the shielding stud 24 can be placed in tension by the counterforce of threaded plug 42 and its threaded engagement with thread 48 in shielding stud 24 since its permissible axial movement substantially parallel to attenuator body 66 is unobstructed. By successively tightening each of the jackbolts 44 (there are a total of 10 jackbolts 44 according to one specific embodiment of the present invention as shown in the cross-section of FIG. 3), a great overall force can be applied to the seal head 26 creating a high pressure seal at the opening 63. As will be readily apparent to one of ordinary skill in the art, the number of jackbolts may be varied depending on the particular embodiment of the present invention.

As discussed in detail above, the shielding-stud attenuator 10 can use one tensioner ring 43 with a seal head 26 making a first sealing assembly, and one threaded plug 42 with a seal head 26 making a second sealing assembly to provide the pressure bearing capability for pressure chamber 16. However, according to another embodiment, two identical sealing assemblies with tensioner ring 43 and seal head 26 that cooperate with end formations of the accumulator body 66 could be used at each end of the shielding-stud attenuator 10 and still be within the scope and spirit of the present invention.

Similarly in yet another embodiment, a sealing assembly composed of tensioner ring 43 and seal head 26 used at one end of the shielding-stud attenuator 10, coupled with a shielding stud that is capped off at a second end against which a seal head 26 abuts, and the cap includes a clearance hole 57 thus eliminating the need of threaded plug 42, altogether with an attenuator body 66 therebetween could be fashioned and still be considered within the scope and spirit of the present invention.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An attenuator for a high-pressure fluid system, said attenuator comprising:
    a shielding stud including a first end, a second end, and a cylindrical space extending axially between said first end and said second end;
    a high-pressure, cylindrical, attenuator body disposed within said cylindrical space of said shielding stud, said shielding stud not inhibiting axial movement of said high pressure attenuator body within said cylindrical space, said high pressure attenuator body including a bore that extends from a first end to a second end of said high pressure attenuator body and defining a pressure chamber with first and second openings thereto formed at the first and second ends respectively of said high pressure attenuator body, said shielding stud having a wall thickness that is thinner than a wall thickness of said high pressure attenuator body;
    a first seal head positioned against said first end of said attenuator body and sealing said first opening to said pressure chamber, said first seal head including a first tapered engaging face that abuts a first wedge surface formed in said attenuator body and surrounding said first opening and said first seal head having a passageway there through for the passage of a fluid from said pressure chamber;
    a threaded plug threadedly coupled to an inner threaded surface in said first end of said shielding stud and extending within the first end of said shielding stud;
    a second seal head positioned against said second end of said attenuator body and sealing said second opening to said pressure chamber, said second seal head including a second tapered engaging face that abuts a second wedge surface formed in said attenuator body and surrounding said second opening and said second seal head having a passageway there through for the passage of a fluid from said pressure chamber;

a tensioner ring threadedly coupled to an inner threaded surface in said second end of said shielding stud and extending within said second end of said shielding stud; and a plurality of jackbolts threaded through said tensioner ring, at least one of said plurality of jackbolts having an end contacting said second seal head to bias said second tapered engaging face of said second seal head against said second wedge surface surrounding said second opening to said pressure chamber;

wherein an interior diameter of an inner surface of the shielding stud, along at least a portion of its length surrounding the attenuator body is greater than an outer diameter of the attenuator body such that a gap is formed between the attenuator body and the shielding stud along at least a portion of the length of the attenuator body.

2. The attenuator of claim 1, wherein said end of said at least one of said plurality of jackbolts contacts a lateral face of said second seal head, and wherein a wall of said shielding stud extends axially beyond said lateral face.

3. The attenuator of claim 2, wherein said tensioner ring is threadedly coupled to said wall of said shielding stud extending axially beyond said lateral face and biases said second seal head against said high-pressure attenuator body.

4. The attenuator of claim 1, wherein said first and second seal heads each have a substantially circular cross-section.

\* \* \* \* \*